United States Patent [19]

Greer

[11] Patent Number: 4,989,919
[45] Date of Patent: Feb. 5, 1991

[54] METHOD AND APPARATUS FOR MANUFACTURING COMPLIANT BRUSH SEALS

[75] Inventor: John Greer, Burlington, Canada

[73] Assignee: Pratt & Whitney Canada, Longueuil, Canada

[21] Appl. No.: 393,191

[22] Filed: Aug. 14, 1989

Related U.S. Application Data

[62] Division of Ser. No. 238,082, Aug. 30, 1988, Pat. No. 4,884,850.

[51] Int. Cl.$^5$ ............................................. B25B 11/00
[52] U.S. Cl. ...................................... 300/10; 29/281.1; 269/47
[58] Field of Search .................. 269/47, 49, 52, 40, 269/246, 287; 300/2, 4, 5, 8, 9, 10, 11, 21; 29/464, 559, 281.1, 281.3; 228/159, 160, 170, 212; 415/174; 277/53, 95, 227

[56] References Cited

U.S. PATENT DOCUMENTS

| | | | |
|---|---|---|---|
| Re. 30,206 | 2/1980 | Ferguson et al. | 415/174 |
| 356,158 | 1/1887 | Quinby | 300/10 |
| 2,672,640 | 3/1954 | Peterson et al. | 300/21 X |
| 3,901,488 | 8/1975 | Riddle | 269/47 X |
| 4,274,575 | 6/1981 | Flower | 228/160 |
| 4,642,867 | 2/1987 | Hough et al. | 228/160 X |

Primary Examiner—Joseph M. Gorski
Attorney, Agent, or Firm—Troxell K. Snyder

[57] ABSTRACT

A method and fixture (10) for assembling compliant seals (30) includes an aligning member (12) having a grooved surface (14) for receiving a plurality of loose bristle elements (16). The bristle elements (16) are received within the grooves (26) and aligned thereby. First and second backing rings (20, 22) sandwich the aligned bristles (16) and are clamped by first and second clamping members (18, 24). The clamped rings (20, 22) and bristle elements (16) are then removed from the aligning member (12) and permanently secured together, forming the finished seal (30).

1 Claim, 2 Drawing Sheets

METHOD AND APPARATUS FOR MANUFACTURING COMPLIANT BRUSH SEALS

This is a division of copending application Ser. No. 07/238,082 filed on Aug. 30, 1988 now U.S. Pat. No. 4,884,850.

FIELD OF THE INVENTION

The present invention relates to a method and an apparatus useful in assembling compliant brush seals.

BACKGROUND

Compliant seals for preventing gas leakage between a stationary housing and a rotating shaft passing therethrough are well known. Such seals include a plurality of individual bristles consisting of metallic wire or other fiber, extending from a backing member into contact with the rotating shaft. The ends of the bristles brush lightly against the rotating shaft, hence such seals may also be termed "brush seals".

The packed bristles of the seal discourage gas flow between the stationary housing and the shaft, while the contact of the bristles with the shaft establishes a "zero clearance" between the seal and shaft further enhancing the seal effectiveness.

Such seals include inherent advantages in terms of resistance to high temperatures and the ability to accommodate radial runout of the shaft, as well as reduced component cost as compared to known labyrinth or knife edge seals used in gas turbine engines.

As has long been appreciated by those familiar with such sealing elements, it is necessary to pack the individual bristles uniformly about the circumference of an annular seal as well as to align each bristle element properly so as to achieve the desired advantages. It is easily apparent that even a slight deficiency in the arrangement of the bristles about the backing ring can give rise to a leakage path which could compromise the brush seal effectiveness.

Present methods of manufacturing brush seals preassemble a quantity of individual bristles into a quantity of small bundles which are arranged and temporarily secured at the desired alignment. The backing member is fabricated from two annular rings which are disposed on opposite sides of the assembled bristle bundles with the bristles and annular backing rings being permanently secured, thus forming the completed seal.

One such method, disclosed in U.S. Reissue Pat. No. 30,206, provides an annular holding ring having a plurality of radial holes disposed therein. Bundles of individual bristles are drawn radially into the holes and secured by a wire loop pulled manually through the holding ring outer periphery. After drawing all the individual bristle bundles into the holding ring, first and second annular backing rings are fused to the bristles and the brush seal separated from the holding ring by cutting or otherwise machining away the excess bristle material. The remainder of the individual bristle bundles must then be removed from the holding ring and the process repeated for the next seal.

Another prior art method, disclosed in U.S. Pat. No. 4,274,575, preassembles individual bristle bundles into short cylindrical tubes, arranging a plurality of such tubes about an annular holding member in the desired orientation. The small tubes may be secured by adhesive or some other convenient scheme. The annular backing rings are again placed adjacent the protruding bristles and fused or otherwise permanently secured to form the brush seal.

Such preassembly methods require additional steps to temporarily secure the individual bristle bundles prior to positioning and permanently securing the annular backing rings. Additionally, the use of discrete bundles of bristles can result in a nonuniformity of the bristle density in the circumferential direction. Further, and in particular with respect to the holding member having a plurality of radial passages disposed therein, repeated use of the holding member results in wearing of the passages and the possibility of the occurrence of misalignment of individual bristles.

What is needed is a simple, effective method for temporarily positioning, aligning, and restraining individual bristles prior to permanently securing the bristles to the backing members.

SUMMARY OF THE INVENTION

It is therefore an object of the present invention to provide a method and means for holding, aligning, and positioning a plurality of individual bristle elements preparatory to securing the bristle elements to a backing ring thereby forming a completed brush seal.

It is further an object of the present invention to provide a method and means for holding the bristle elements which is particularly well adapted for use with automatic machinery.

According to the present invention, an aligning member is provided which includes a surface having a plurality of grooves disposed therein. The bristle elements are received in and correctly aligned by the grooves extending from at least one groove end.

The portion of the bristle elements extending from the groove is sandwiched between two backing members which are clamped securely between two releasable holding members. The backing members and bristle elements are removed from the grooved aligning member which is ready for immediate re-use.

The brush seal is completed by removing any excess bristle material and by permanently securing the bristle elements to the backing rings. The holding members are ready for immediate reuse in assembling subsequent brush seals.

Unlike prior art seal assembly methods and fixtures, the means and method according to the present invention is particularly well adapted for automatic execution. By positioning the grooved aligning member in conjunction with a bristle dispensing device capable of delivering preset quantities of uniformly cut bristles, the grooved aligning member may be rotationally indexed as each groove receives the proper size and number of bristles. The clamping of the aligned bristles between the holding members against the backing member(s), either comprising a single annular member or a pair of annular members sandwiching the bristles therebetween, to be removed from the aligning member and machined, welded or otherwise worked without disturbing the desired alignment. The backing rings and bristles are permanently secured by any of a variety of known methods such as welding, soldering, bonding, etc.

Both these and other objects and advantages of the seal assembly method and apparatus of the present invention will be apparent to those skilled in the art upon review of the following specification and the appended claims and drawing figures.

DETAILED DESCRIPTION OF THE PREFERRED EMBODIMENT

Figure 1:
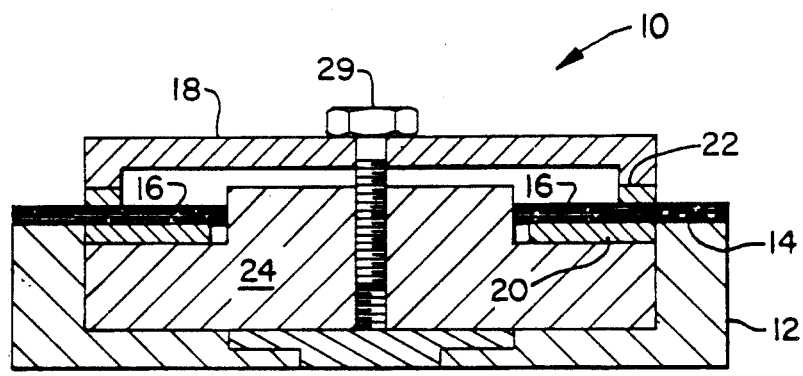
FIG. 1 shows a cross section of the assembly apparatus according to the present invention.

Referring now to the drawing figures, and in particular to FIG. 1 thereof, an apparatus according to the present invention will be described in detail. FIG. 1 shows a fixture arrangement 10 according to the present invention. The fixture 10 includes an annular aligning member 12 having an annular surface 14 which is adapted, as discussed hereinbelow, to receive and align a plurality of separate bristle members 16.

The fixture also includes a first removable holding member 24 disposed, in the preferred embodiment, within the annular aligning member 12. The holding member 24 supports a first backing ring 20 adjacent the portion of the bristle elements 16 extending beyond the surface 14. A second backing ring 22 is positioned opposite the first backing ring 20, sandwiching the bristle elements 16 therebetween.

A second holding member 18 is provided behind the second backing ring 22. The holding members 18, 24 are forced together by urging means, such as a threaded bolt 29, securely but releasably clamping the backing rings 20, 22 and bristle elements 16. The sub-assembly of holding members 18, 24, bristle elements 16, and backing rings 20, 22 is removed from the aligning member 12. The bristle elements 16 remain in the desired alignment and the aligning member 12 is ready for reuse.

Figure 4:
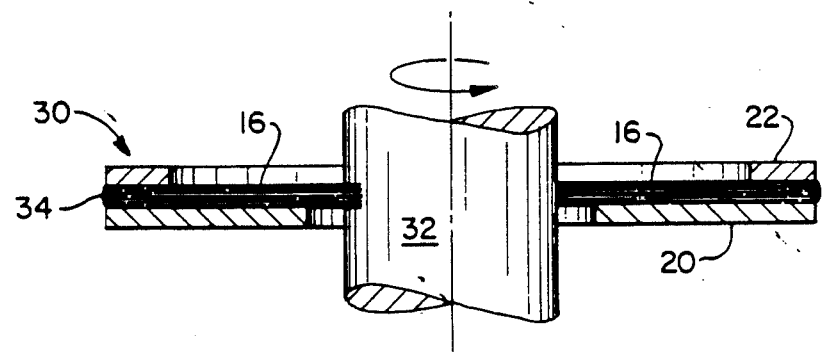
FIG. 4 shows a completed brush seal disposed about a rotating shaft.

The clamped bristles 16 and backing rings 20, 22 are then fused or otherwise permanently secured together forming a brush seal 30 which is ultimately used for sealing between a static housing (not shown) and a rotating shaft 32 as shown in FIG. 4. The step of permanently securing the bristles 16 to the backing rings 20, 22 includes, for example, welding or fusing the bristles and backing rings together and subsequently trimming excess bristle material radially outward of the fusing weld 34.

Figure 2:
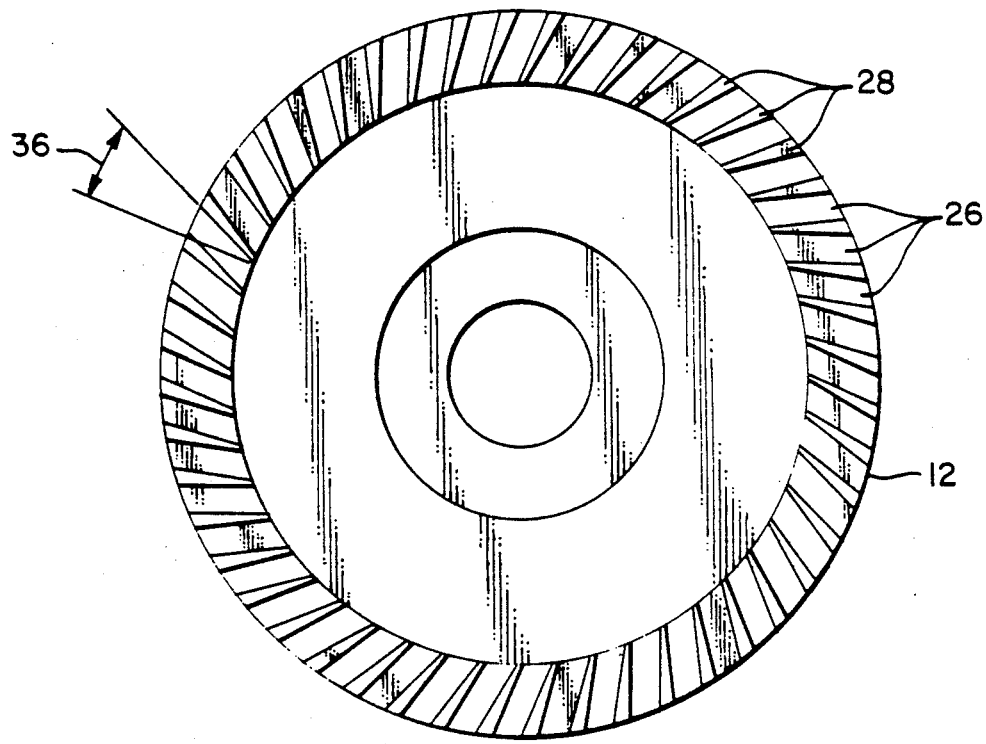
FIG. 2 shows a view of the grooved aligning member as indicated in FIG. 1.
Figure 3:
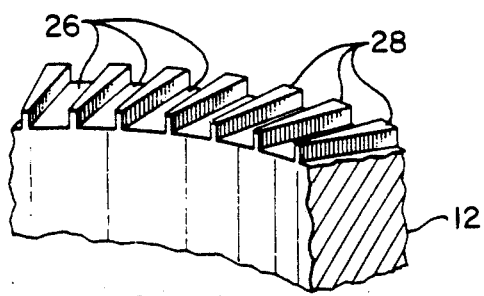
FIG. 3 shows a perspective detail of the grooved surface of the aligning member.

FIG. 2 shows a top view of the aligning member 12 giving a more detailed view of the clamping surface 14. Grooves are disposed in the surface 14, and are angularly skewed by an angle 36 with respect to the radius of the annular surface. The angle 36 varies according to the diameter, resiliency of the bristle material, speed of rotation of the shaft, etc. but is, for most applications, approximately 45°. Raised land portions 28 separate the grooves 26 and assist the alignment of the individual bristle members 16 in the equally spaced grooves 26. FIG. 3 shows a view of the grooves 26 and lands 28 as indicated in FIG. 2.

Figure 5:
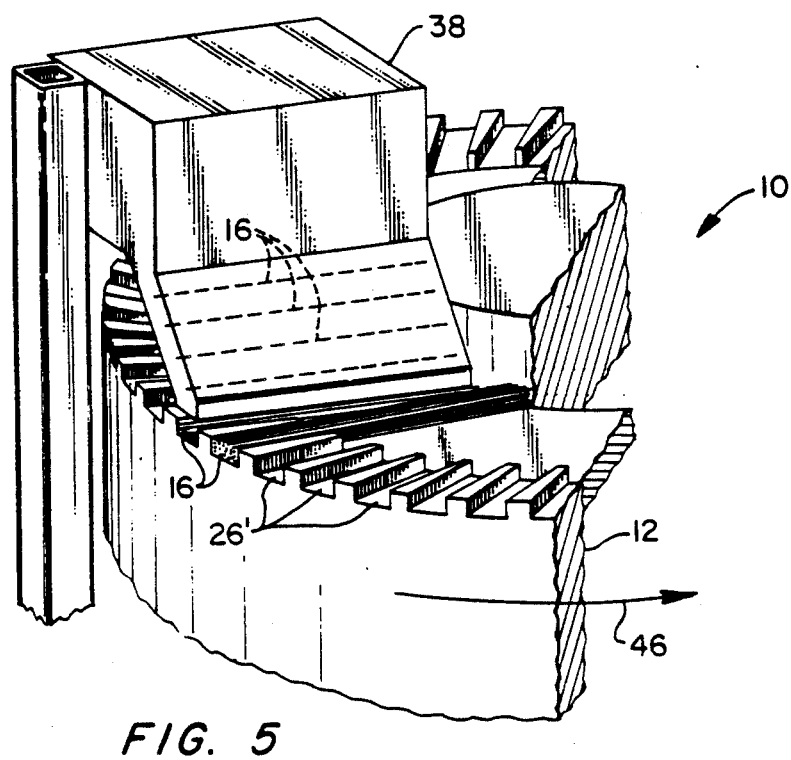
FIG. 5 shows the assembly fixture according to the present invention arranged for automatic manufacture.

FIG. 5 shows one method of automating the assembly procedure according to the present invention wherein a bristle element dispenser 38 delivers a preselected number of individual bristles 16 to each groove 26 in the first member 12. The member 12 is indexed rotationally 46 respective to the bristle dispenser 38 until each groove 26 has been filled with a preselected quantity of bristle elements 16. The second clamping member 18 (not shown in FIG. 5) as well as the second backing ring 22 are then positioned with respect to the fixture 10 and the bristles 16 and backing members 20, 22 temporarily clamped between the holding members 24, 18 by engaging the bolt 29.

The clamped subassembly 16, 20, 22, 18, 24, 29 is then removed and the rings 20, 22 and bristles 16 permanently secured together. The holding members 18, 24 are released and immediately reused. Additional sets of holding members 18, 24 may be provided to speed up the entire process.

As will now be apparent to those skilled in the art, the method and fixture according to the present invention has several advantageous features not known or achieved in prior art methods of compliant seal manufacture. These advantages include the simplicity of the individual fixture components, with the reusable aligning member 12 being the most complicated. Also, by clamping the backing members 20, 22 and bristle elements 16 securely between the holding members 18, 24, the risk of deformation or damage to the completed seal 30 is reduced during the subsequent handling and trimming operation. It will further be apparent that the individual fixture components do not experience sliding or other wear-inducing contact with the bristles, thereby lengthening the service life of the fixture.

The fixture and method according to the present invention are thus well adapted for achieving the objects and advantages as set forth hereinabove, and it will further be apparent to those skilled in the art that other equivalent configurations and methods may be made and practiced without departing from the scope of the invention which is limited only by the claims as set forth hereinbelow.

I claim:

1. A fixture for assembling a compliant seal having a plurality of bristle elements and first and second seal backing rings, wherein the fixture comprises:
    an annular aligning member including means for receiving and aligning the plurality of bristle elements,
    a first, lower holding ring, disposed cocentrically within the aligning member,
    a second, upper holding ring,
    wherein the first and second seal backing rings are disposed adjacent to the bristle elements and cocentrically within the aligning ring, the backing rings sandwiching the bristle elements therebetween,
    the first and second holding rings sandwiching the first and second backing rings therebetween, and
    means for releasably clamping the first and second seal backing rings between the first and second holding rings, thereby releasably clamping the bristle elements between the first and second backing rings wherein the means for receiving and aligning the plurality of bristle elements includes a pluralaity of linear grooves disposed in an annular surface of the aligning member, the grooves being angularly skewed with respect to a central axis of the aligning member and adapted to receive a quantity of bristle elements therein.

* * * * *